US005568300A

United States Patent [19]
Ishibashi

[11] Patent Number: 5,568,300
[45] Date of Patent: Oct. 22, 1996

[54] FIBER INTERFACE SHELF FOR INTERFACING ATM SWITCH MODULE AND SUBSCRIBER LINE OR TOLL SWITCH

[75] Inventor: Ryoichi Ishibashi, Kawasaki, Japan

[73] Assignee: Fujitsu Limited, Kanagawa, Japan

[21] Appl. No.: 505,604

[22] Filed: Jul. 21, 1995

[30] Foreign Application Priority Data

Oct. 4, 1994 [JP] Japan .................. 6-240050

[51] Int. Cl.⁶ .......................................... H04T 14/08
[52] U.S. Cl. .................... 359/137; 359/139; 359/163; 370/60.1
[58] Field of Search ...................... 359/117, 135, 359/123, 137, 139, 163; 370/60.1, 94.2

[56] References Cited

U.S. PATENT DOCUMENTS

| | | | |
|---|---|---|---|
| 5,105,292 | 4/1992 | Le Roy et al. | 359/117 |
| 5,303,078 | 4/1994 | Brackett et al. | 359/123 |
| 5,303,236 | 4/1994 | Kunimoto et al. | 370/60.1 |

FOREIGN PATENT DOCUMENTS

| | | |
|---|---|---|
| 295031 | 5/1990 | Japan . |
| 2189050 | 7/1990 | Japan . |
| 3-258150 | 11/1991 | Japan . |
| 3-265317 | 11/1991 | Japan . |
| 4-56436 | 2/1992 | Japan . |
| 4-267648 | 9/1992 | Japan . |
| 5-292111 | 5/1993 | Japan . |
| 5-63698 | 12/1993 | Japan . |

Primary Examiner—Leo Boudreau
Assistant Examiner—Kinfe-Michael Negash

[57] ABSTRACT

A fiber interface shelf is connected to a plurality of subscriber lines on one side and to an ATM switch module on the other side for interfacing between the subscriber lines and the ATM switch module. The fiber interface shelf comprises a plurality of fiber interface cards, each of which is connected to a corresponding subscriber line for terminating the corresponding subscriber line, and a fiber interface common card for interfacing between the subscriber lines and the ATM switch module to transfer signals therebetween, the fiber interface common card having, a plurality of selection gates, each being inputted a pair of outputs of the fiber interface cards and outputting one of the pair of outputs, and a control circuit for controlling each of the selection gates to select and output the one of the pair of outputs.

16 Claims, 12 Drawing Sheets

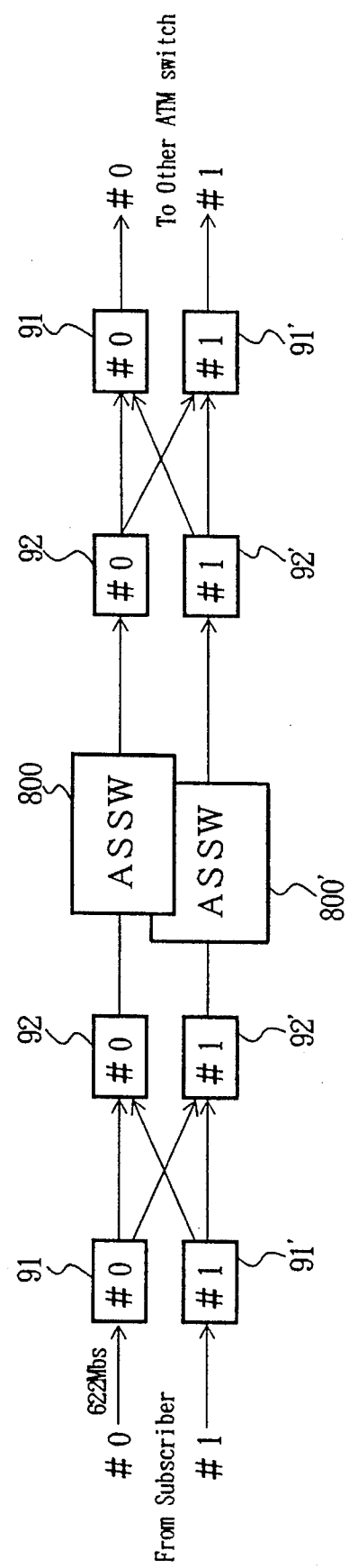

1

FIBER INTERFACE SHELF FOR INTERFACING ATM SWITCH MODULE AND SUBSCRIBER LINE OR TOLL SWITCH

BACKGROUND OF THE INVENTION

1. Field of the Invention

The present invention relates to a fiber interface shelf. More particularly, it relates to a fiber interface shelf that interfaces between subscriber lines and asynchronous transfer mode type (ATM) switch modules, or interfaces between ATM switch modules and interconnecting transmision paths, that is, various kinds of switches, such as a toll switch or the like, on a broadband-ISDN (B-ISDN) system.

2. Description of the Related Art

Commercial use of broadband-ISDN systems has started, and ATM switches employed for the systems have actively been developed in recent years.

Referring now to FIG. 9, a structural example of a broad-band-ISDN system is shown. Shown are ATM switches 80 to 82 that are connected by transmission highways, for example, optical fiber lines 801 to 803. The ATM switches are also connected via a concentrator 83, or directly connected to subscriber lines 804 to 807.

FIG. 10 is a structural example of the ATM switch. In FIG. 10, an ATM switch module 800 is connected to subscribers or users via fiber interface shelves 90. Further, the ATM switch module 800 is connected to ATM toll switches via the fiber interface shelves 90.

More particularly, the fiber interface shelves 90 are connected via high speed transmission paths, such as 622 Mbps highways (SONET STS-3) or the like, to the ATM switch module 800. Speed of the highway is prescribed in the ITU-T, the Bell Core standard or the like.

Each of the fiber interface shelves 90 generally comprises fiber interface cards and a fiber interface common card. The fiber interface card extracts ATM cells employing 53 bytes on a payload of an ATM signal frame format.

The fiber interface common card has a function for attaching a routing selection signal (TAG) of one bite that is stored in a table, not shown in the diagram, based on a Virtual Path Identifier (VPI) and a Virtual Channel Identifier (VCI) included in the ATM cell, i.e., signals for identifying a vertical channel on a physical line, and sending the ATM cell attached with the routing selection signal to the ATM switch module 800 to control the switching of routing signals in the ATM switch module 800.

Subscribers connected via the fiber interface shelves 90 are connected to subscriber transmission paths having various speed variations, such as 45 Mbps to 622 Mbps or the like. In FIG. 10, details of the fiber interface shelf 90 are not shown in the diagram, and a plurality of low speed subscriber transmission paths are multiplexed by a multiplexer, not shown in the diagram. Accordingly, the subscriber transmission paths are interfaced with the speed of optional fiber lines linked to the ATM switch module 800.

There is a case where a subscriber transmission path has the same speed as that of a transmission path on the ATM switch module 800. In this case, the subscriber transmission path is not multiplexed, but it is interfaced with optical fiber lines on the ATM switch module 800.

Referring now to FIGS. 11A and 11B, explanation diagrams are shown for illustrating the relationship of connection between the ATM switch module 800 in the ATM switch and the fiber interface cards and the fiber interface common card that form a fiber interface shelf, when the subscriber transmission path has the same speed, for example, 622 Mbps, as that of the optical fiber line on the side of the ATM switch module 800.

Shown are the duplexed ATM switch modules (#0, #1) 800, 800'. The duplexed fiber interface common cards 92, 92' are provided on both the subscriber line side (WEST side) and the interconnecting transmission path side (EAST side) corresponding to the duplexed ATM switch modules 800, 800'.

Further, FIG. 11A illustrates a flow from the side of the subscriber line (WEST side) to the interconnecting transmission path side (EAST side) in an upward direction. FIG. 11B further illustrates a flow from the side of the interconnecting transmission path (EAST side) to the side of the subscriber line (WEST side) in a downward direction.

As the subscriber line is simplex in the example of FIGS. 11A and 11B, a fiber interface card 91 of the subscriber line side is switchably connected to the fiber interface common cards 92, 92', which are provided for working and protection, respectively. The duplexed fiber interface common cards 92, 92' are connected to the duplexed fiber interface cards 91, 91' on the inerconnecting transmission path side of the ATM switch modules 800, 800'.

Fiber interface common cards 92, 92' having a duplexed structure and fiber interface cards 91, 91' are crossed over and switched according to an active (ACT) or standby (STB) mode on the interconnecting transmission path side, to which other toll switches are connected, that is, the EAST side of the ATM switch modules 800, 800'.

The above-described structure is provided for a flow from the subscriber side (WEST side) to the interconnecting transmission path side (EAST side) in the upward direction and a flow from the interconnecting transmission path side (EAST side) to the subscriber side (WEST side) in the downward direction.

FIG. 12 illustrates a diagram for explaining the relationship between ATM switch modules 800, 800' and fiber interface cards 91, 91' and fiber interface common cards 92, 92' that form a fiber interface shelf when employing duplexed subscriber transmission paths.

In FIG. 12, only the upward direction from the subscriber side (WEST side) to the interconnecting transmission path side (EAST side) is shown. However, as well as the case shown in FIG. 11, the downward direction from the interconnecting transmission path side (EAST side) to the subscriber side (WEST side) has the same structure as that of the upward direction.

In FIG. 12, a pair of fiber interface cards 91, 91' are also provided corresponding to the duplexed subscriber lines, and the fiber interface cards 91, 91' are switched and connected to the fiber interface common cards 92, 92' according to a an active (ACT) or standby (STB) mode on the side of subscriber lines. Other connecting forms are the same as those shown in FIG. 11A.

FIG. 13 is a block diagram illustrating an example of a fiber interface shelf when the subscriber side corresponding to FIG. 11A employs a simplex two-channel structure. In FIG. 13, two subscriber lines I and II with the speed of 622 Mbps are respectively connected to each of duplexed fiber interface common cards 92, 92' in the fiber interface shelf, which is enclosed with a broken line in the diagram, via the fiber interface cards 910, 911', respectively.

FIG. 14 is a diagram illustrating an example of the fiber interface shelf when the subscriber line side corresponding to FIG. 12 also employs a duplexed 1+1 structure. In FIG. 14, the duplexed subscriber lines I and I' are connected to the corresponding fiber interface cards 91 and 91', respectively.

Further, the fiber interface cards 91, 91' are connected to the duplexed fiber interface common cards 92, 92'. In FIG. 14, each of the fiber interface common cards 92, 92' selects a main signal on a working path of the duplexed subscriber lines I and I' and sends it to the corresponding ATM switch modules 800, 800'.

The above-described fiber interface common cards 92, 92' shown in FIGS. 13 and 14 are formed as shown in FIG. 15. In FIG. 15, only the structure of the interface common card 92 is shown, as the structure of the card 92' is the same as that of the card 92. The fiber interface common card 92 comprises selecting gates 920 and 921, a controller 922, a signal circuit 923, a multiplexer 924, which inserts an internal communication signal sent from the signal circuit 923 into a main signal, a demultiplexer 925, which branches the internal communication signal sent from the ATM switch module 800 and a Virtual Channel Converter (VCC) 926, which inserts a TAG signal that controls the selection of routing path of signals in the ATM switch module 800.

The selecting gate 920 switches and outputs the main signal on active one of a pair of fiber interface cards 91, 91'. The main signal sent from the ATM switch module 800 is commonly outputted to a pair of the fiber interface cards 91, 91', under the control of controller 922.

Further, the selecting gate 921 has a function for looping back signals sent from the ATM switch module 800, under the control of the controller 922 at a loop-back testing.

Each fiber interface common card has the same structure as shown in FIG. 15, in both the simplex two channel structure mode shown in FIG. 13 and the duplexed structure mode formed of one working line and one protecting line (hereinafter, referred as to a 1+1 duplexed structure) shown in FIG. 14. Both the controller 922 and the signal circuit 923 can be used to switch the main signal commonly for the both modes.

Accordingly, it is not always necessary to provide the controller 922 and the signal circuit 923 on each fiber interface common card. If the structure shown in FIG. 15 is employed in the cases shown in FIGS. 13 and 14, circuit structures become redundant and the miniaturization of a device cannot be improved.

When the fiber interface common card having a simplex two-channel structure shown in FIG. 13 is switched to be used as the card having a 1+1 duplexed structure shown in FIG. 14, one set of fiber interface common cards 92, 92' is not used as shown in FIG. 14.

Furthermore, as apparent from FIGS. 11A, 11B and 12, the fiber interface shelf provided on the subscriber line side of the ATM switch modules 800, 800' can have the same structure as that of the fiber interface shelf provided on the interconnecting transmission path side of the ATM switch modules 800, 800'. In general, the subscriber transmission path has a simplex structure, and the interconnecting transmission path has a duplex structure.

SUMMARY OF THE INVENTION

Accordingly, it is an object of the present invention to provide a fiber interface shelf in an ATM switch that employs fiber interface common cards connected to the subscriber line side of the ATM switch module and an interconnecting transmission path side, and the same structure, so that the cost for the fiber line interface can be reduced.

It is another object of the present invention to provide a fiber interface shelf of the ATM switch that can be used for a simplex two channel structure and a 1+1 simplex structure, and can reduce the cost and be miniaturized by sharing one part of the structure, such as a controller, in the working and protecting fiber interface shelves.

A fiber interface shelf connected to a plurality of subscriber lines on one side and to an ATM switch module on the other side for interfacing between the subscriber lines and the ATM switch module, the fiber interface shelf may comprise a plurality of fiber interface cards, each of which is connected to a corresponding subscriber line for terminating the corresponding subscriber line and a fiber interface common card for interfacing between the subscriber lines and the ATM switch module to transfer signals therebetween, the fiber interface common card having a plurality of selection gates, each being inputted a pair of outputs of the fiber interface cards and outputting one of the pair of outputs, and a control circuit for controlling each of the selection gates to select and output the one of the pair of outputs.

Further, other objects of the present invention become clear by the description for explaining embodiments according to the attached drawings.

BRIEF DESCRIPTION OF THE DRAWINGS

FIG. 12 is a diagram for explaining an example of a duplexed structure of the subscriber lines.

DESCRIPTION OF THE PREFERRED EMBODIMENTS

Figure 1:
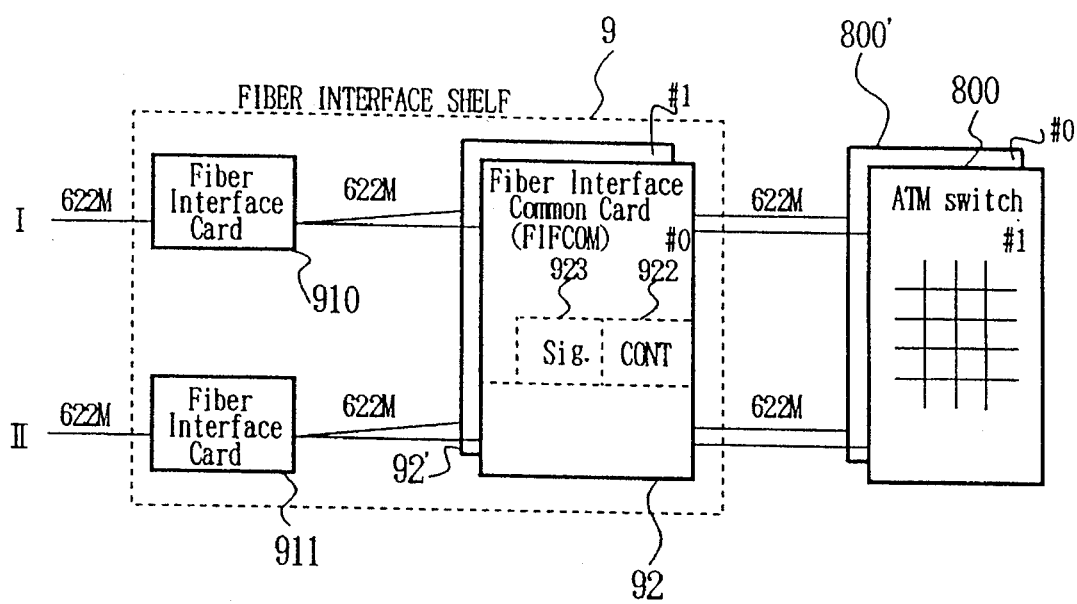
FIG. 1 is a block diagram for explaining an example of a simplex two channel structured fiber interface shelf according to the present invention.

Throughout the following descriptions, the same reference numerals are used to denote and identify corresponding or identical components.

Referring now to FIG. 1, a block diagram for explaining a principle of the present invention according to an example of a switch including a fiber interface shelf of the present invention, formed with a simplex two channel structure. Shown is a fiber interface shelf 9 according to the present invention, of which fiber interface cards 910 and 911 are connected to subscriber lines I and II, respectively.

Although in FIG. 1, the fiber interface cards 910 and 911 are connected to subscriber lines I and II, the invention is not restricted to the structure and the fiber interface cards 910 and 911 may be connected to interconecting transmission paths, which are provided between toll switches according to the present invention.

Then, the fiber interface cards 910 and 911 are commonly connected to the duplexed fiber interface common cards 92, 92'. The fiber interface common cards 92, 92' are further connected to the duplexed ATM switch modules 800, 800'.

Figure 13:
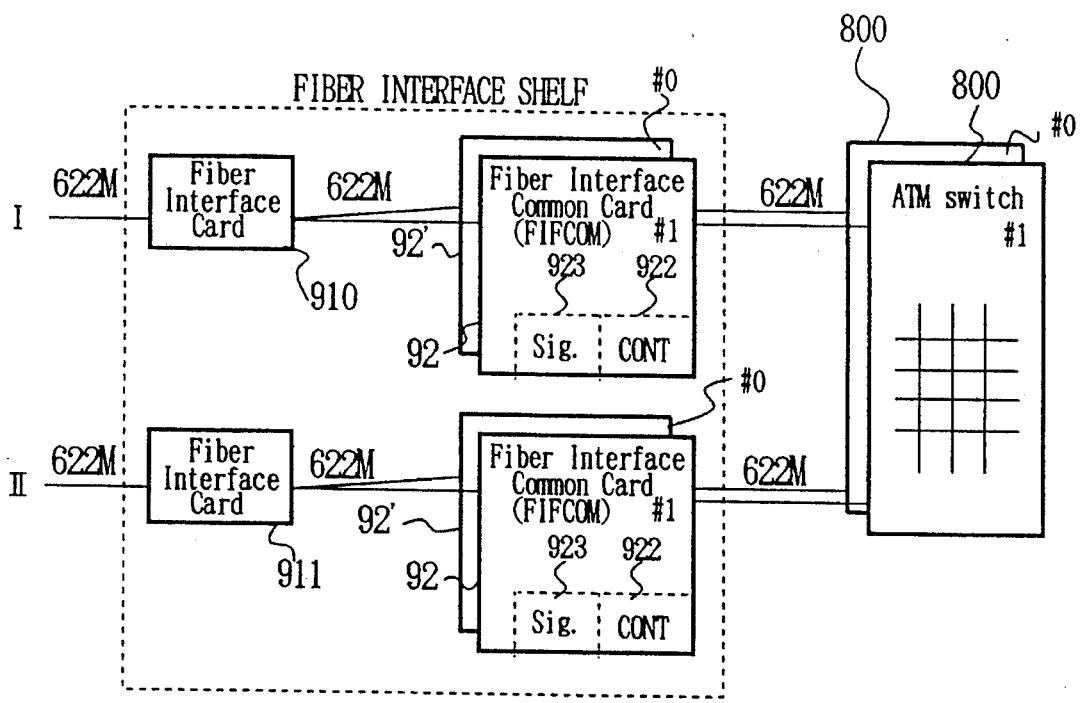
FIG. 13 is a diagram for explaining an example of a simplex two-channels structured fiber interface shelf.

In comparison with the conventional example shown in FIG. 13, two sets of the duplexed fiber interface common cards 92, 92' are independently provided for fiber interface cards 910, 911 connected to the subscriber lines I and II in FIG. 13.

Contrarily, in FIG. 1, the two sets of the duplexed fiber interface common cards 92, 92' are united into one structure and sections of the controller 922 and the signal circuit 923 are shared or one set of fiber interface cards 92, 92'. Therefore, one set of a signal circuit 923 and a control circuit 922 can be omitted.

Figure 2:
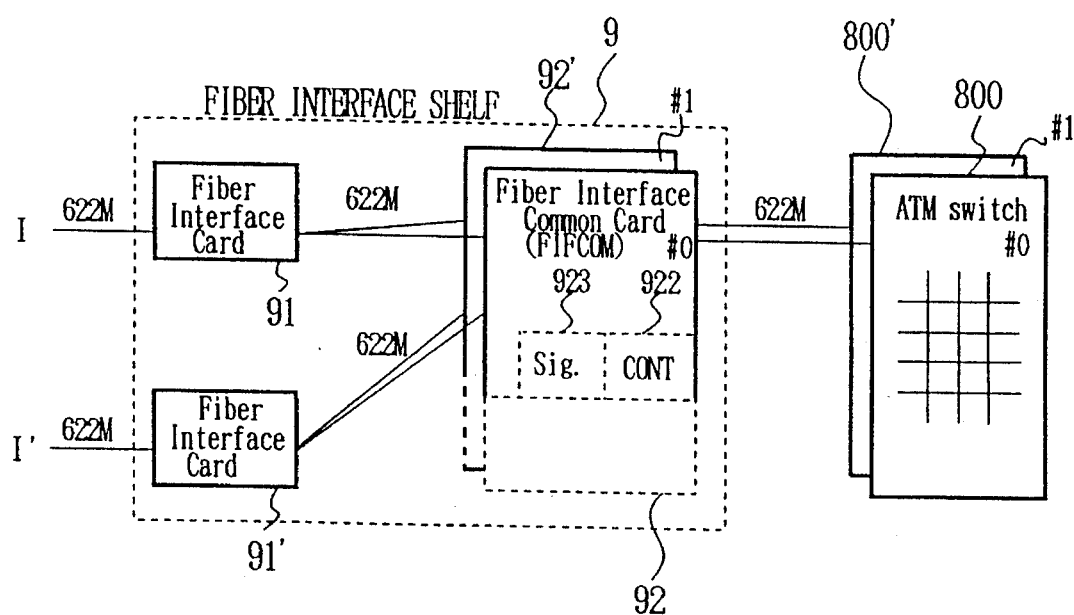
FIG. 2 is a block diagram for explaining an example of a duplexed 1+1 line structured fiber interface shelf according to the present invention.

FIG. 2 is a principle block diagram for explaining an applied example of a 1+1 duplexed structure of the fiber interface shelf according to the present invention. In FIG. 2, the duplexed subscriber lines I, I' are respectively connected to the duplexed fiber interface cards 91, 91' in the fiber interface shelf.

A pair of working and protecting fiber interface cards 91, 91' are connected to the duplexed fiber interface common cards 92, 92'.

Each of the fiber interface common cards 92, 92' selects a main signal of a corresponding working subscriber line from outputs of fiber interface cards 91, 91' and sends it to the corresponding ATM switch modules 800, 800'.

The structure of fiber interface common cards 92, 92' shown in FIG. 2 are the same as those of fiber interface common cards 92, 92' shown in FIG. 1. However, circuits are provided for only one channel in the fiber interface common cards 92, 92' shown in FIG. 2, when employing a 1+1 duplexed structure.

In the present invention, it becomes apparent from FIGS. 1 and 2 that the fiber interface common cards 92, 92' are commonly-employed in both the cases of employing a simplex two-channel structure and of employing a 1+1 duplexed structure. Further, the structures shown in FIGS. 1 and 2 will be compared with FIGS. 13 and 14, respectively. The controller 922 and the signal circuit 923 are commonly shared for a plurality of channels in the fiber interface common cards 92, 92'.

Consequently, it becomes possible to reduce a scale of hardware of the fiber interface common cards 92, 92'. Therefore, it also becomes possible to increase capacity of the shelf, and to reduce the cost per one channel.

Figure 3:
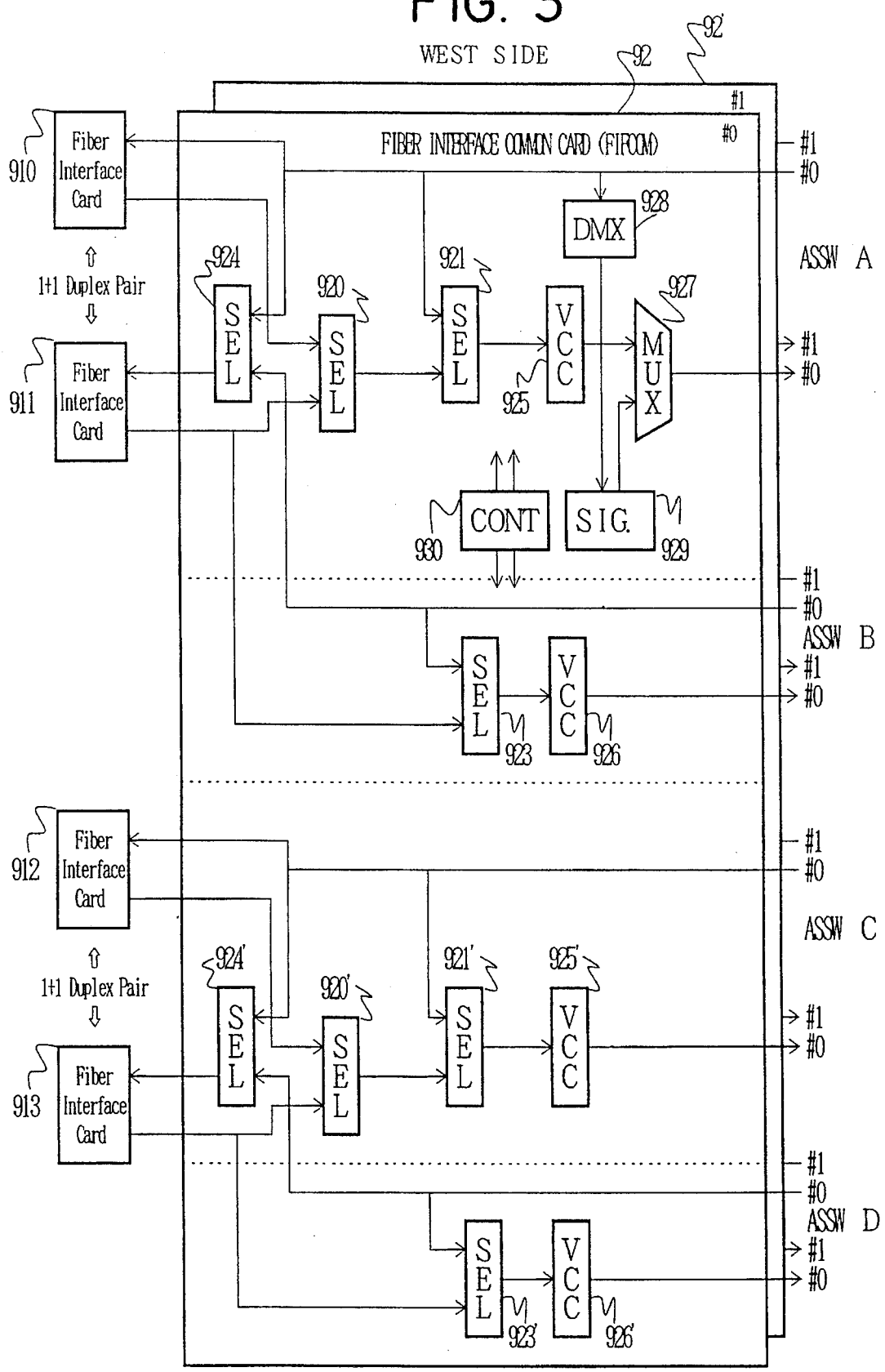
FIG. 3 is a block diagram of a structural example of the fiber interface shelf on the side of subscriber lines.
Figure 4:
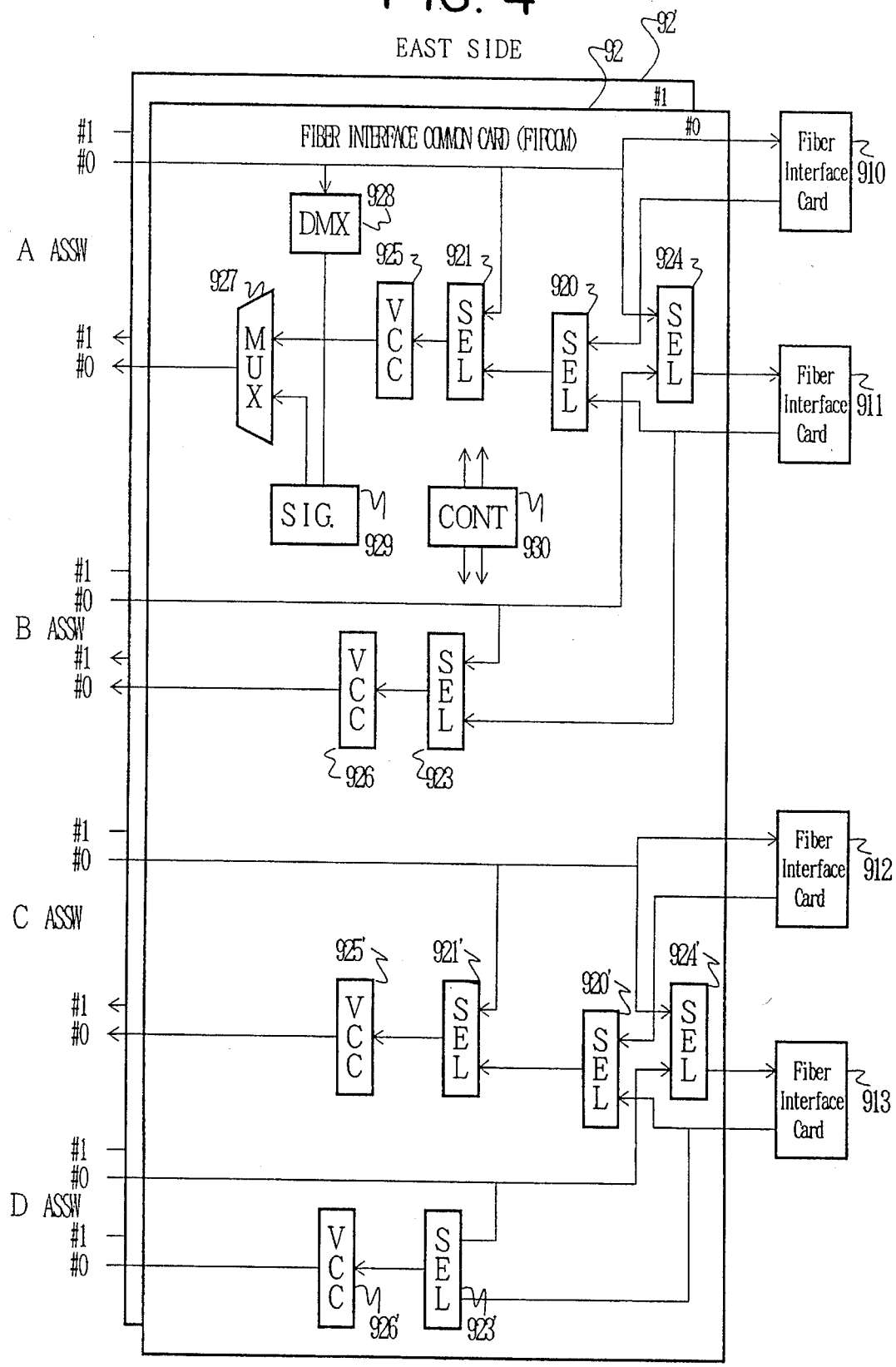
FIG. 4 is a block diagram of a structural example of the fiber interface shelf of interconnecting transmission path on the side of toll switches.

FIGS. 3 and 4 are detailed block diagrams of structural examples of the fiber interface shelf according to the present invention, which is connected to the side of subscriber lines (WEST side) of the duplexed ATM switch modules 800, 800' and the side of toll switches (EAST side).

In the examples of FIGS. 3 and 4, when employing a simplex structure, the fiber interface shelf is connected to the subscriber lines for 4 channels. When employing duplexed subscriber lines, the two subscriber lines form a pair of 1+1 duplexed structures.

In FIG. 3, the fiber interface common cards 92, 92' of a duplexed structure are connected on the EAST side to the ATM switch modules 800, 800' via highways A to D. The fiber interface cards 910 to 913 are linked to subscriber lines on the WEST side.

In FIG. 4, the ATM switch modules 800, 800' are connected to the WEST side of the duplexed structured fiber interface common cards 92, 92' via highways A to D. The fiber interface common cards 910 to 913, which interface with toll switches are provided on the EAST side.

As described above, the structure shown in FIG. 3 is the same as that shown in FIG. 4, but a flowing direction of a main signal is reversed. Accordingly, the detailed explanation will be performed referring to only the structure shown in FIG. 3.

In FIG. 3, fiber interface common cards 92, 92' have selecting gates 920, 921, 923, 920', 921' and 923' facing to the east direction and selecting gates 924 and 924' facing to the west direction.

Further, virtual channel convertors (VCC) 925, 926, 925' and 926' are connected to outputs of the selecting gates 921, 923, 921' and 923', respectively.

The virtual channel convertors (VCC) 925, 926, 925' and 926' insert tag patterns to determine routing of signal in the ATM switch modules 800, 800', based on VCI (Virtual Channel Identifier) or VPI (Virtual Path Identifier) for specifying virtual channel and path on the physical lines, included in the ATM cell extracted by the fiber interface cards 910 to 913, as described later.

A commonly-used multiplexer 927 and a demultiplexer 928 are provided on the fiber interface common cards 92, 92'. The multiplexer 927 adds an internal communication signal sent from the signal circuit 929 to a main signal sent from the virtual channel convertor 925 and outputs it to the side of the ATM switch modules 800, 800'.

The demultiplexer 928 demultiplexes the internal communication signal sent from the side of the ATM switch modules 800, 800' and inputs it to the signal circuit 929. Each of the above-described selecting gates is switched by the controller 930, based on signaling control described later.

One controller 930 is commonly provided to control the above-described selecting gates. Signaling of an internal communication signal between the signal circuit 929 and the ATM switch modules 800, 800' is commonly performed on the signal circuit 929. Accordingly, the signaling circuit 929 can be also formed of a commonly-used circuit as well as the case of the above-described controller.

Figure 14:
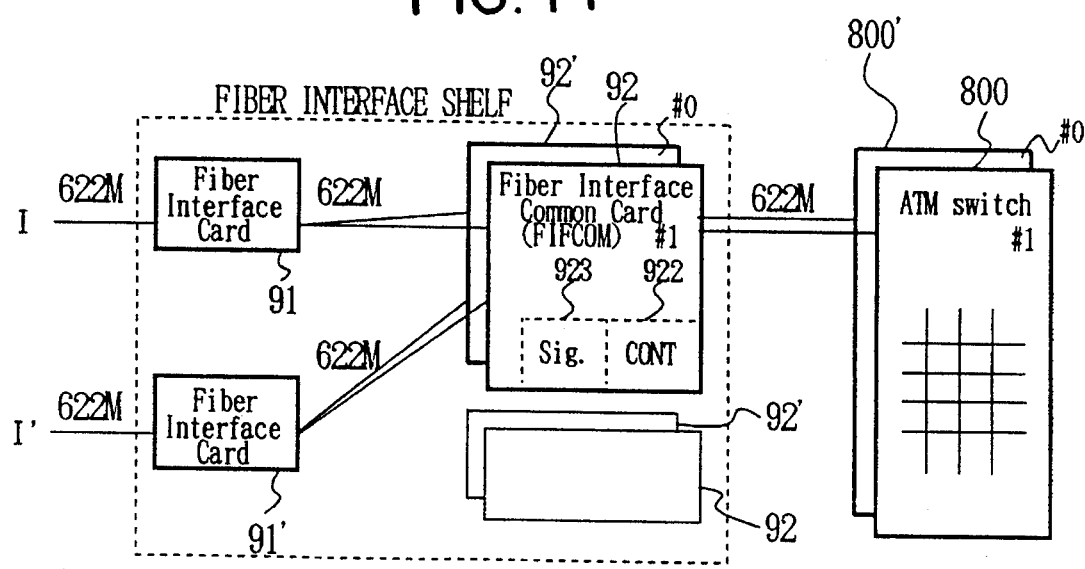
FIG. 14 is a diagram for explaining an example of a 1+1 duplexed structure of a fiber interface shelf.
Figure 15:
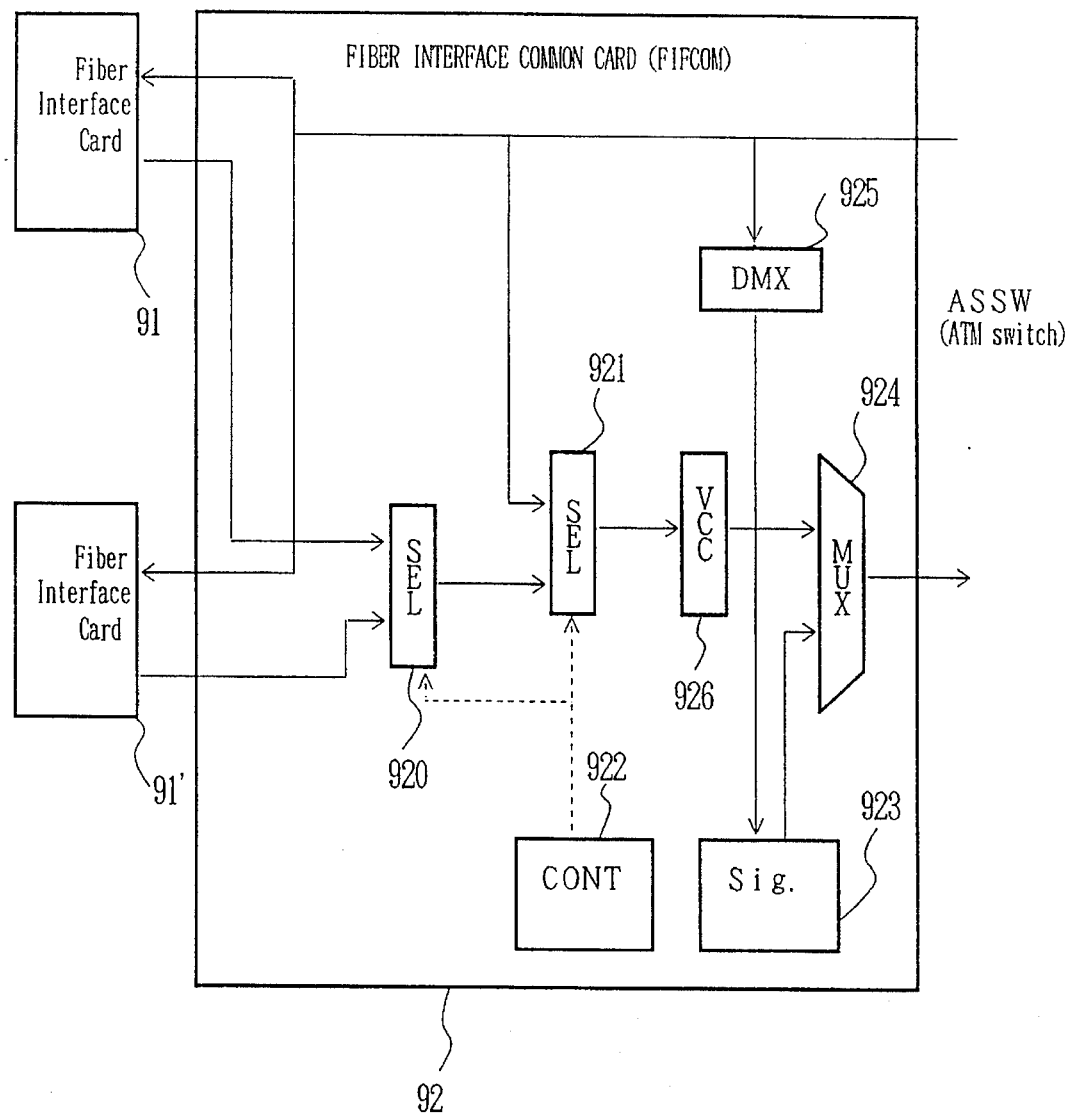
FIG. 15 is a block diagram of a structural example of a conventional fiber interface shelf.

As compared with the conventional system shown in FIGS. 13 and 14, in the structure of fiber interface common card on the ATM switch interfaces 800, 800' according to the present invention, the controller 930 and the signal circuit 929 can be shared and miniaturized.

As described above, in the structure shown in FIGS. 3 and 4, the operation of fiber interface common cards in the case of employing a simplex four channel structure will be explained in accompanying with FIG. 1 explaining a simplex two-channel structure.

In FIG. 3, subscriber lines for four channels are connected to fiber interface cards 910 to 913. That is, the fiber interface cards 910 to 913 are connected to the corresponding subscriber lines for four channels.

A main signal sent from the subscriber line linked to the fiber interface card 910 in the upward direction toward the ATM switch module is passed through the selecting gates 920 and 921. TAG and an internal communication signal sent from the signal circuit 929 are added to the main signal. The signal added with the TAG and an internal communication signal is sent to the highway A of the ATM switch modules 800, 800'.

Similarly, a main signal sent from the subscriber line linked to the fiber interface card 911 is passed through the selecting gate 923. TAG is attached to the main signal on the virtual channel convertor 926. The signal added with the TAG is sent to the highway B of the ATM switch modules 800, 800'.

Further, a main signal sent from the subscriber line linked to the fiber interface card 912 is passed through the selecting gates 920' and 921'. TAG is attached to the main signal on the virtual channel convertor 925'. The signal added with the TAG is sent to the highway C of the ATM switch modules 800, 800'.

Furthermore, a main signal sent from the subscriber line linked to the fiber interface cards 913 is passed through the selecting gate 923'. TAG is attached to the main signal on the virtual channel convertor 926'. The main signal added with the TAG is sent to the highway D of the ATM switch modules 800, 800'.

The main signals sent downward from the highways A and C of the ATM switch modules 800, 800' are respectively sent to the fiber interface cards 910 and 912, directly. The main signals sent from the highways B and D are respectively sent to the fiber interface cards 911 and 913 via the selecting gates 924 and 924'.

When applying the fiber interface common cards shown in FIG. 3 to the 1+1 duplexed structure corresponding to that shown in FIG. 2, respective two duplexed pairs are formed by the fiber interface cards 910 and 911 and the fiber interface cards 912 and 913, respectively.

Accordingly, two subscriber lines connected to the fiber interface cards 910 and 911 become working and protecting lines which transmit a same main signal that is sent from one subscriber. Simultaneously, two subscriber lines connected to the fiber interface cards 912 and 913 also become working and protecting lines, which transmit a same main signal connected to another subscriber.

When the subscriber lines linked to the fiber interface cards 910 and 912 are working, the outputs from the fiber interface cards 910 and 912 are selected from the selecting gates 920 and 920' and sent the selected signals to the highways A and C on the side of the ATM switch module, respectively.

The input from the highway A on the ATM switch module side is commonly sent to the fiber interface cards 910 and 911. The input from the line C on the ATM switch module side is commonly sent to the fiber interface cards 912 and 913.

In FIGS. 3 and 4, the selecting gates 921 and 921' loop-back signals sent from the ATM switch modules 800, 800', when the signals are employed for loop-back testing.

Figure 5:
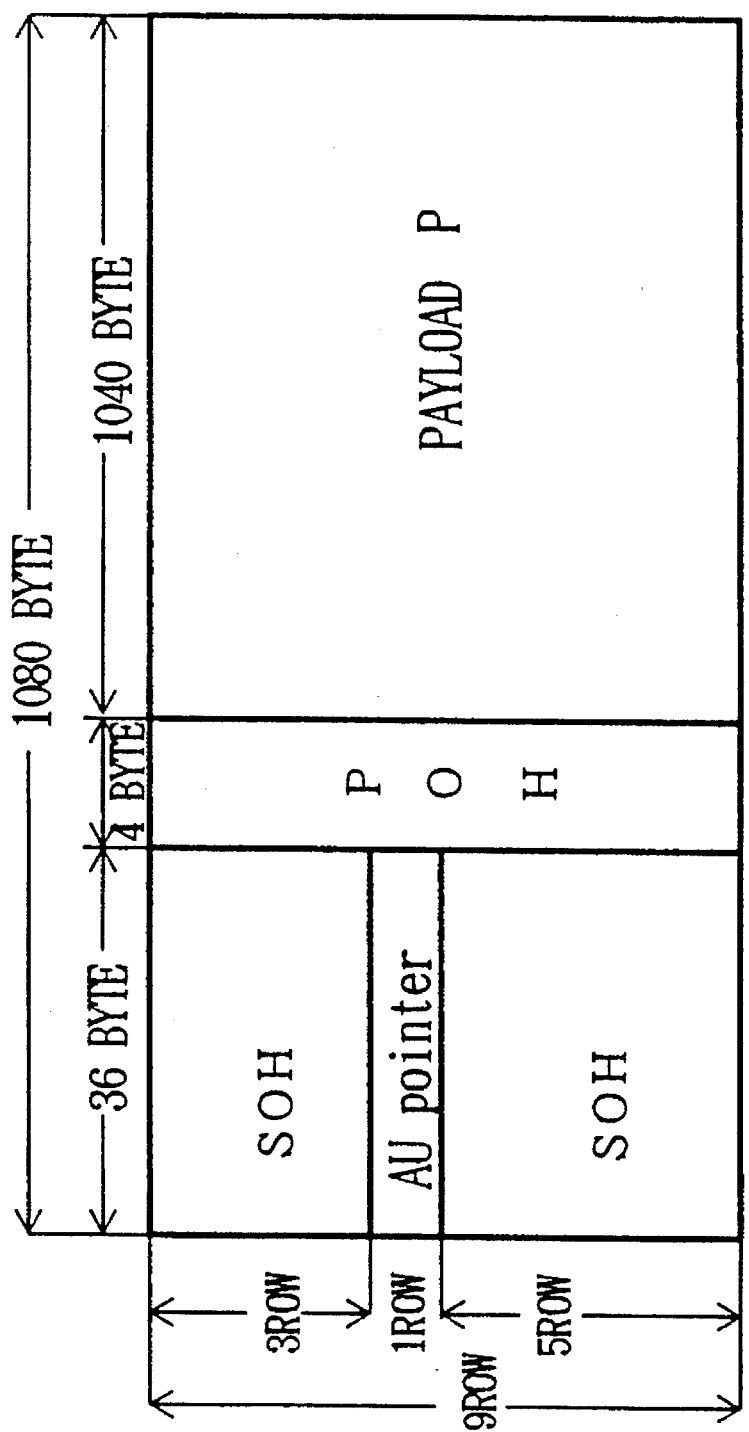
FIG. 5 is an explanatory diagram of a signal frame format.

FIG. 5 shows a frame format of SONET (Synchronous Optical communication NETwork) developed by AT & T Co., Ltd. The frame format is formed of 1080 bytes/1 row×9 rows. The fiber interface cards 910 to 913 extract ATM cells having 53 bytes on a payload area P of the frame format and input it to the fiber interface common cards 92, 92'.

TAG of 1 byte is added to the ATM cell of 53 bytes by the virtual channel convertors 925, 925', 926, 926' in the fiber interface common cards 92, 92'.

Figure 6:
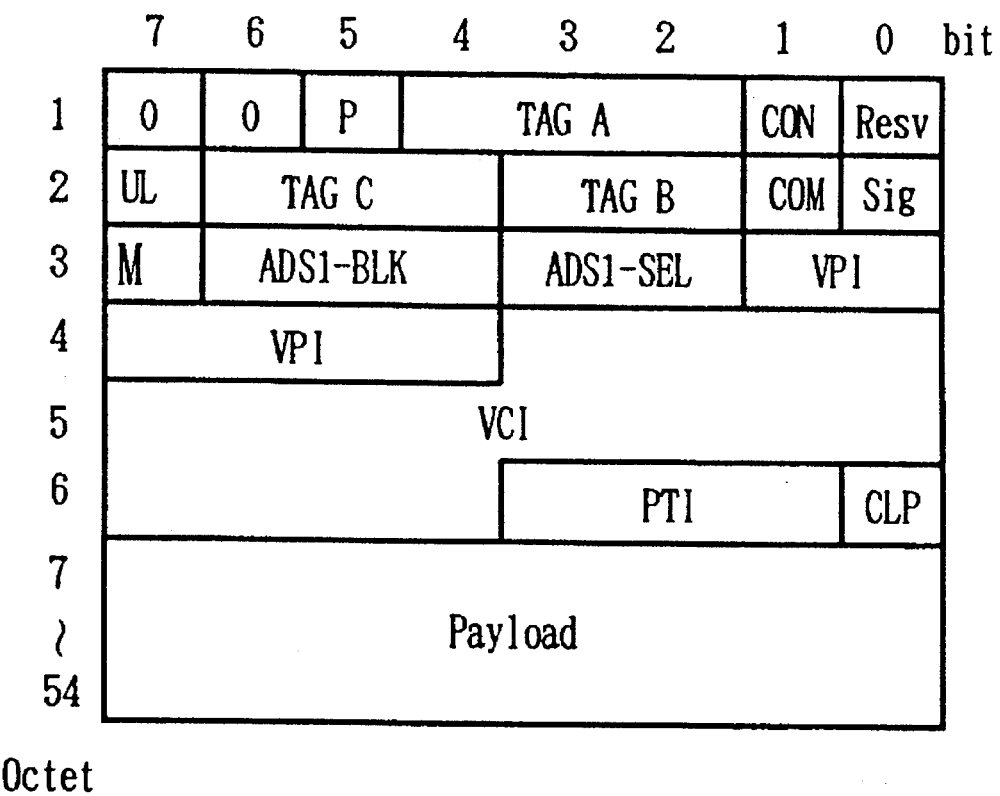
FIG. 6 is an explanatory diagram of an ATM cell frame format.

FIG. 6 shows a format of the TAG-A to TAG-C having 1 byte added to the ATM cell in the above-described frame format P by the virtual channel convertors 925, 925', 926, 926'. Further, the ATM cell has 54 bytes in FIG. 6.

Figure 7:
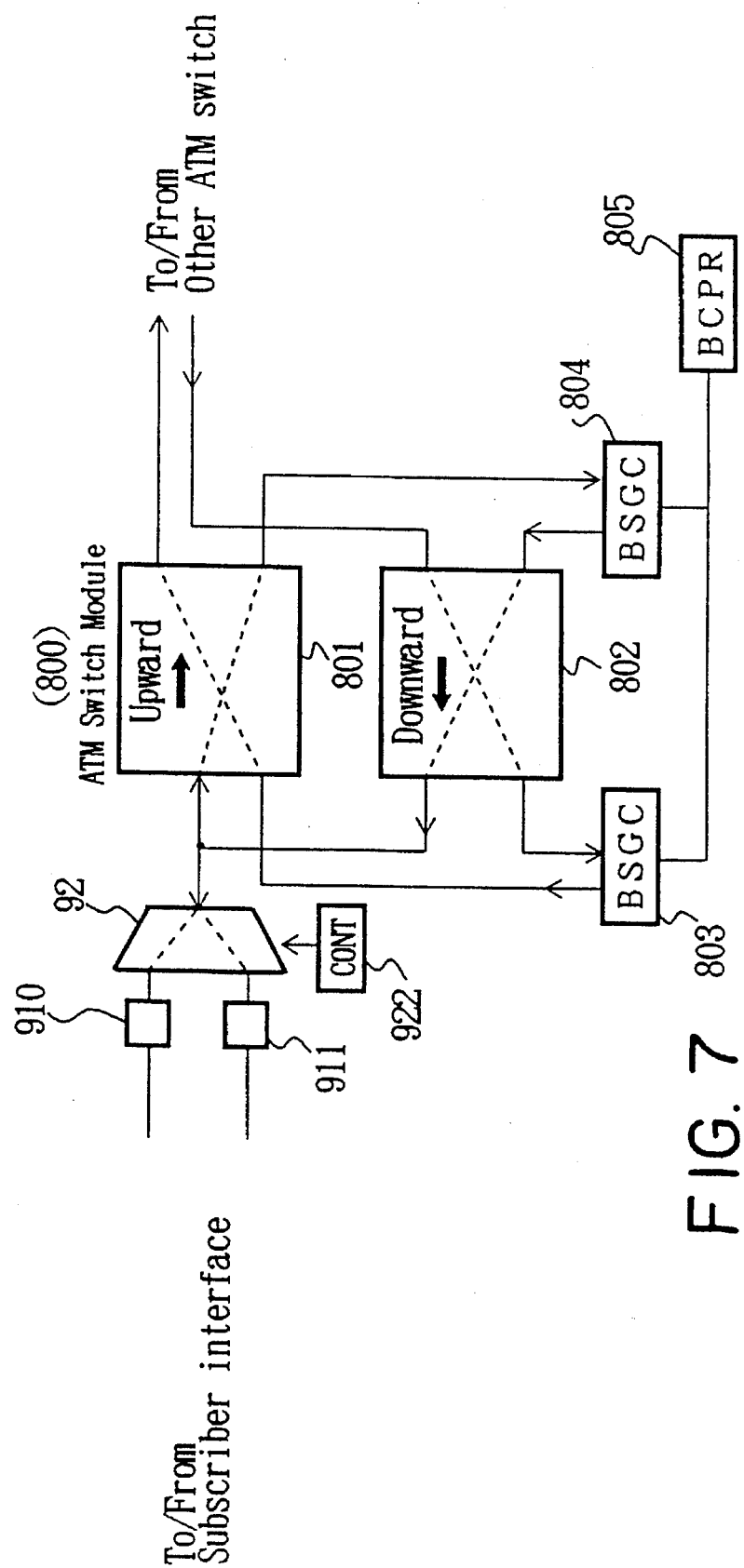
FIG. 7 is a block diagram of a structural example of an ATM interface module.

FIG. 7 shows a structure of the ATM switch module 800. More particularly, it shows a diagram for explaining signaling control in the switch. In FIG. 7, reference numerals 910 and 911 are the fiber interface cards, as explained in FIG. 3, 92 is a main functional section of the fiber interface common card, and 922 is the controller in the fiber interface common card 92.

Further, reference numerals 801 and 802 are cross switches in the upward and downward directions of the ATM switch module 800. Routing is performed in the cross switches according to the TAG included in the above-described ATM cell. Furthermore, reference numerals 803 and 804 are broadband signaling controllers (BSGC) and 805 is a broadband call processor (BCPR).

The broad band call processor 805, in which OS (Operation Software) is stored, has a function of executing the control of an entire system. Broadband signaling controllers (BSGC) 803 and 804 provided in the ATM switch modules 800, 800' have functions of high level data link control procedure (HDLC) for the ATM cell.

The broadband signaling controllers (BSGC) 803 and 804 are controlled by the broadband call processor (BCPR) 805, and the broadband signaling controllers (BSGC) 803, 804 also provide internal communication between the broadband call processor (BCPR) and the fiber interface common cards 92, 92'.

Figure 8:
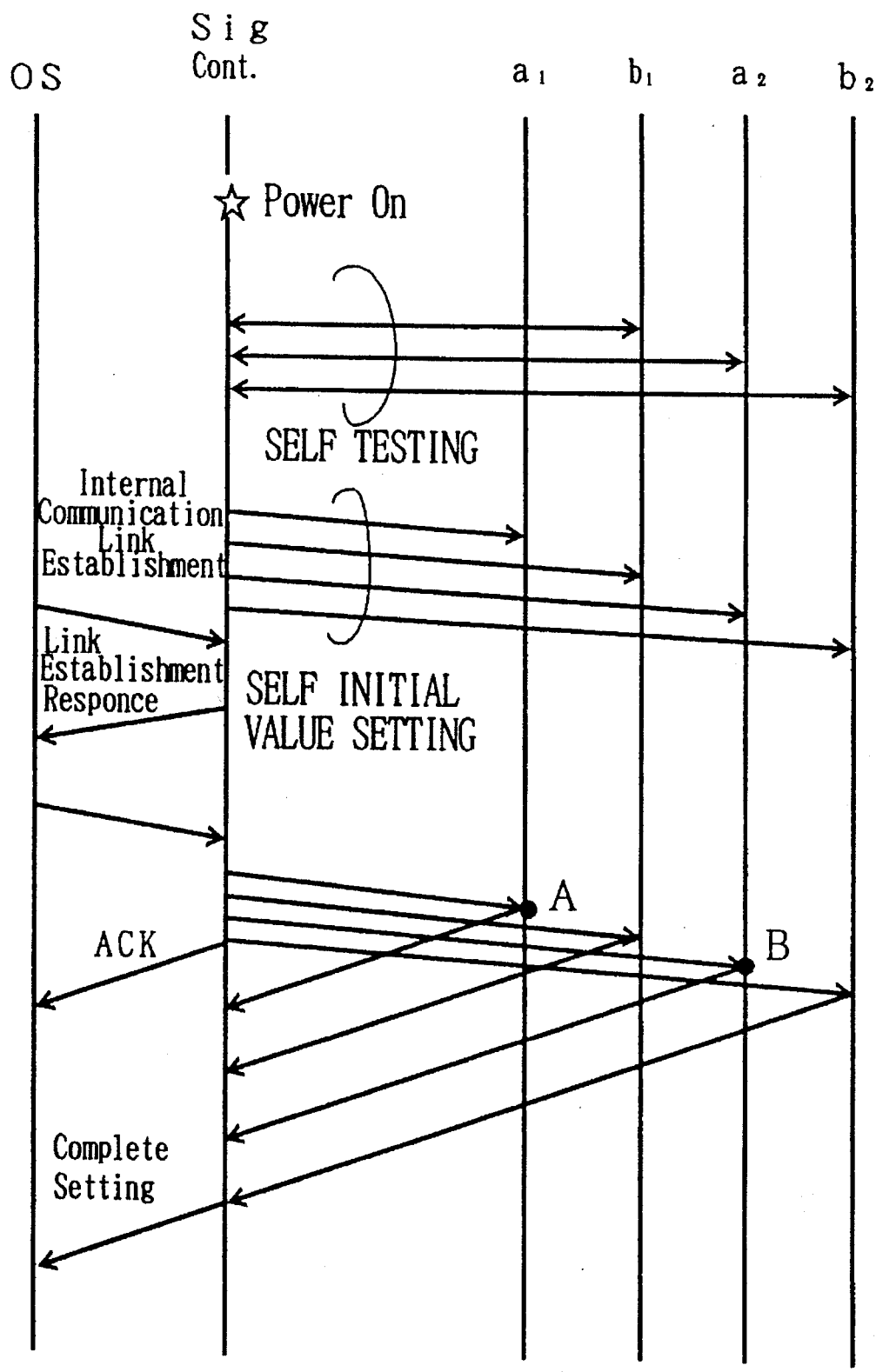
FIG. 8 shows an operational sequence chart of fiber interface common cards.
Figure 9:
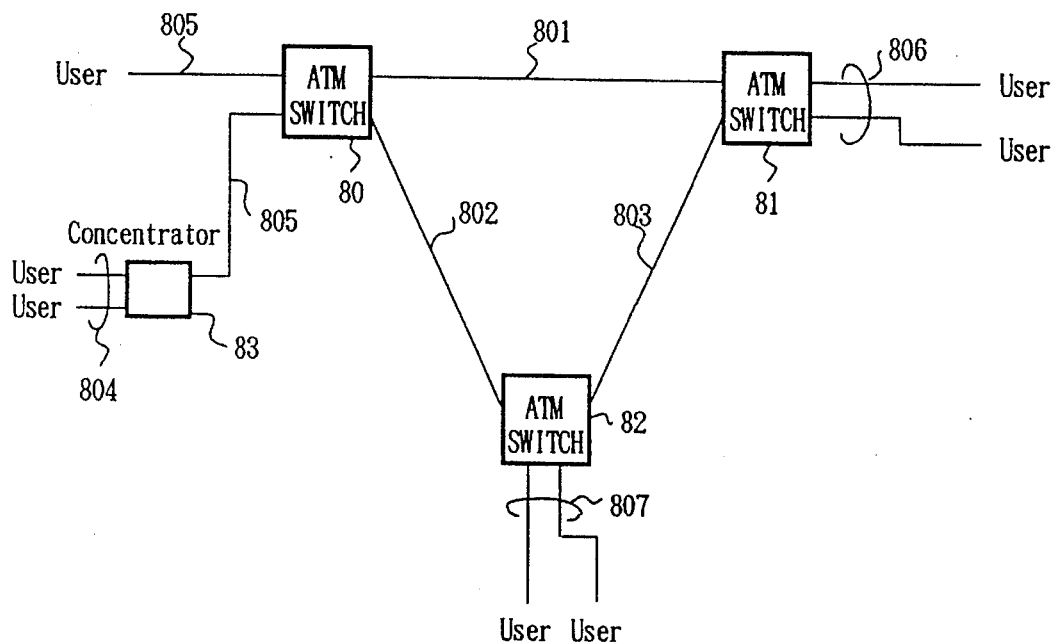
FIG. 9 is a diagram for explaining the outline of the structure of a broadband-ISDN system.
Figure 10:
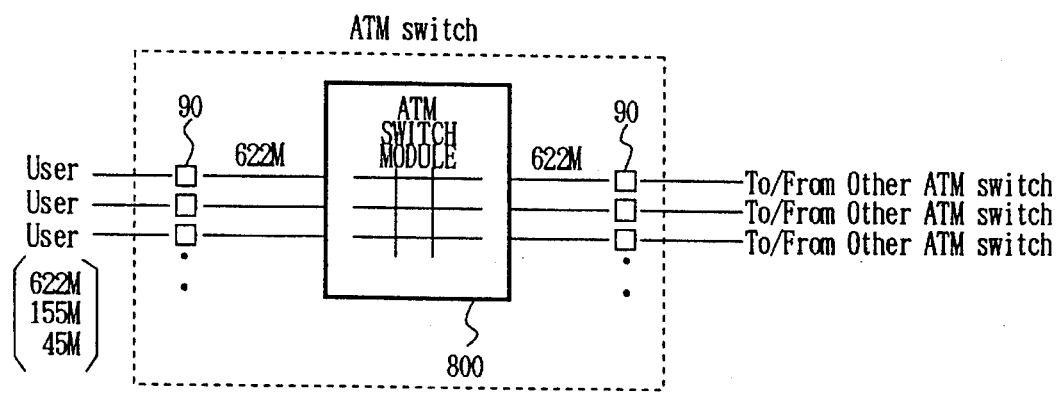
FIG. 10 is a diagram for explaining the outline of the structure of an ATM switch.
Figure 11A:
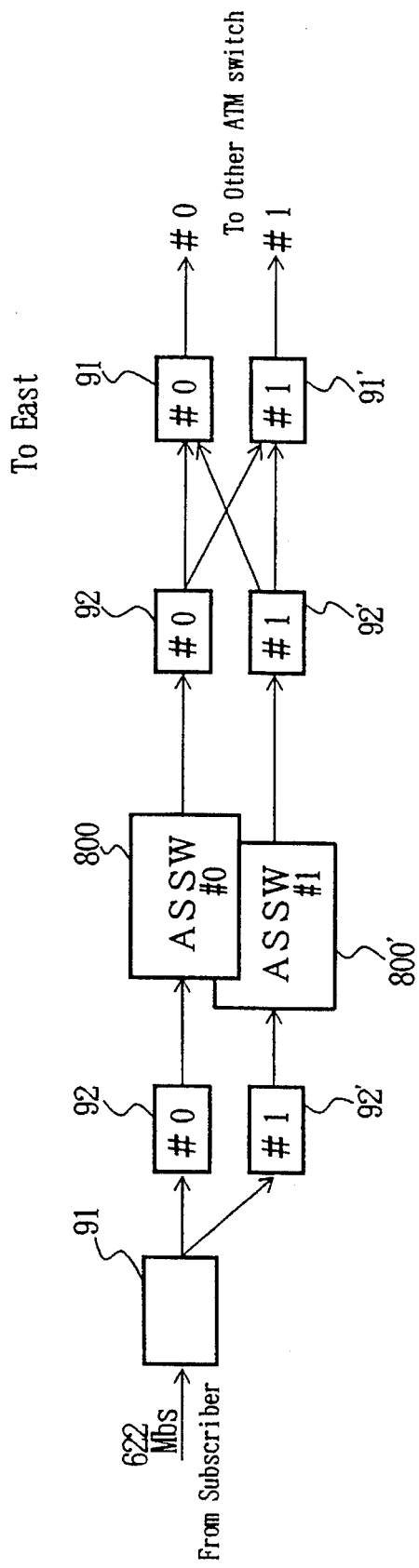
FIGS. 11A and 11B are block diagrams for explaining an example of a simplex two channel structure of subscriber lines.
Figure 11B:
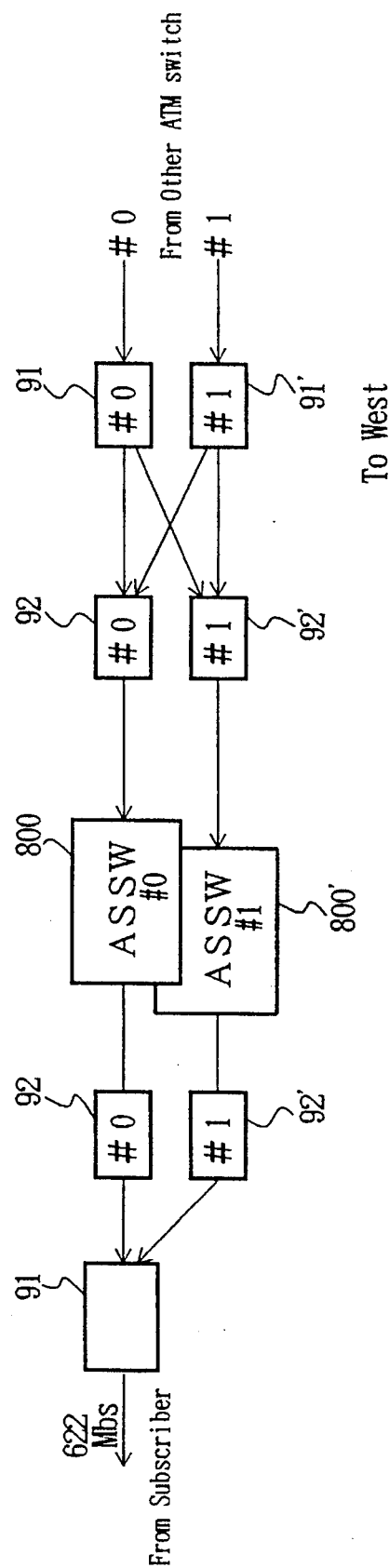

FIG. 8 shows an operational sequence of the fiber interface common cards 92, 92'. Signaling between the broadband signaling controller (BSGC) 804 (refer to FIG. 7) and controller 930 of fiber interface common cards 92, 92' is performed according to OS for the broadband call processors (BCPR) 805.

The above-described setting of a simplex or duplexed mode is performed according to the internal communication signal. In FIG. 8, when power is on, self testing is performed for each function by the controller 930, at first.

In FIG. 8, $a_1$ shows a section for forming a group linked to the highway A in the fiber interface common cards 92, 92', and $b_1$ simultaneously shows a section for forming a group linked to the highway B. $a_2$ shows a section for forming a group linked to the highway C, and $b_2$ shows a section for forming a group linked to the highway D.

When the self testing is finished, a self initial setting of equipment is performed for the above-described groups $a_1$, $b_1$, $a_2$ and $b_2$ under the control of controller 930. Then, a request of internal communication link establishment are sent from the broadband signaling controller (BSGS) 804 of the ATM switch modules 800, 800' to the controller 930, based on the control of broadband call processor (BCPR) 805 according to the OS.

When receiving the request of internal communication link establishment, a response to the request of the link establishment is inserted to a main signal by the multiplexer 927 as an internal communication signal, and it is sent to the ATM switch module 800 from the controller 930 through the signal circuit 929.

The response of the link establishment is received by the broadband signaling controller (BSGC) 804 of the ATM switch module 800. Then, an initial setting signal is sent from the broadband signaling controller (BSGC) 804 to the controller 930 of the fiber interface common card 92.

This initial setting signal includes a control signal for switching simplex and duplexed structures. Accordingly, when the controller 930 receives the initial setting signal, the controller 930 multiplexes an acknowledgement signal ACK to a main signal as an internal communication signal, and returns it to the broadband signaling controller 804. Simultaneously, each of the above-described groups $a_1$, $b_1$, $a_2$ and $b_2$ are set to a simplex or duplexed mode.

The setting of a simplex or duplexed mode can be performed by switching the selecting gates 920, 920', 924 and 924' of the fiber interface common cards 92, 92' shown in FIGS. 3 and 4 with the timings A, B indicated by ● in FIG. 8.

Before a switching control signal is received to set a simplex or duplexed mode, the selecting gates 920 and 920' are set so as to control on the duplexed mode as a default mode.

If each of the above-described groups is completed to set, the information is sent to the broadband signaling controller (BSGC) 804.

In the above-described embodiment, subscriber lines for four channels are connected when employing a simplex mode. However, the present invention is not restricted to this case. Accordingly, it is possible that the (n+1) subscriber lines are connected to the fiber interface common card. In this case, it can be applied to a n:1 duplexed structure.

As explained according to the above-described embodiment, the fiber interface shelf according to the present invention comprising fiber interface cards and fiber interface common cards can employ a common structure, even if the fiber interface common card is switched to a simplex or duplexed mode.

Further, it becomes possible to have the same structure for the fiber interface shelves provided on the subscriber line side and the toll switch side of the ATM switch module. Accordingly, it also becomes possible to reduce the cost of a system and miniaturize the size of the system.

What is claimed is:

1. A fiber interface shelf connected to a plurality of transmission lines on one side and to an ATM switch module on the other side for interfacing between the transmission lines and the ATM switch module, the fiber interface shelf comprising:

a plurality of fiber interface cards, each of which is connected to a corresponding transmission line for terminating the corresponding transmission line; and a fiber interface common card for interfacing between the transmission lines and the ATM switch module to transfer signals therebetween, the fiber interface common card having, a plurality of selection gates, each being inputted a pair of outputs of the fiber interface cards and outputting one of the pair of outputs, and a control circuit for controlling each of the selection gates to select and output the one of the pair of outputs.

2. The fiber interface shelf according to claim 1, wherein the transmission lines are subscriber lines.

3. The fiber interface shelf according to claim 2, wherein the fiber interface common card includes a pair of same structures and the pair are used for working and protection.

4. The fiber interface shelf according to claim 3, wherein different signals are sent on each of subscriber lines, and the control circuit controls each of the selection gates to transmit each different signal to the ATM switch module.

5. The fiber interface shelf according to claim 3, wherein each two of the subscriber lines are paired and inputted with same signals, and the control circuit controls the selection gates of the fiber interface common card to select and send the signals on a working line of the paired subscriber lines to the ATM switch module.

6. The fiber interface shelf according to claim 3, further comprising a signaling circuit provided in the fiber interface common card for receiving and sending an internal communication signal.

7. The fiber interface shelf according to claim 1, wherein the speed of signals on the transmission lines are the same as that of signals on transmission paths between the ATM switch module and the fiber interface common card.

8. A fiber interface shelf connected to a plurality of toll switches on one side and to an ATM switch module on the other side for interfacing between the toll switches and the ATM switch module, the fiber interface shelf comprising:

a plurality of fiber interface cards, each of which is connected to a corresponding toll switch for terminating the corresponding toll switch; and a fiber interface common card for interfacing between the toll switches and the ATM switch module to transfer signals therebetween, the fiber interface common card having, a plurality of selection gates, each being inputted a pair of outputs of the fiber interface cards and outputting one of the pair of outputs, and a control circuit for controlling each of the selection gates to select and output the one of the pair of outputs.

9. The fiber interface shelf according to claim 8, wherein the fiber interface common card includes a pair of same structures and the pair are used for working and protection.

10. The fiber interface shelf according to claim 9, wherein different signals are sent on each of the plurality of toll switches, and the control circuit controls each of the selection gates to transmit each different signal to the ATM switch module.

11. The fiber interface shelf according to claim 9, wherein each two of the plurality of the toll switches are paired and inputted with same signals, and the control circuit controls the selection gates of the fiber interface common card to select and send the signals on a working line of the paired toll switches to the ATM switch module.

12. The fiber interface shelf according to claim 9, further comprising a signaling circuit provided in the fiber interface common card for receiving and sending an internal communication signal.

13. The fiber interface shelf according to claim 8, wherein the speed of signals on the toll switches are the same as that of signals on transmission paths between the ATM switch module and the fiber interface common card.

14. An asynchronous transfer mode switch for use in a broad-band ISDN system, the switch comprising:

an ATM switch module having first and second sides for switching routes of ATM cell signals;

a first interface shelf connected to a plurality of first transmission lines on one side and to the first side of the ATM switch module on the other side; and a second interface shelf connected to a plurality of second transmission lines on one side and to the second side of the ATM switch module on the other side, each of the first and second interface shelves having, a plurality of fiber interface cards, each of which is connected to a corresponding transmission line for terminating the corresponding transmission line; and a fiber interface common card for interfacing between the transmission lines and the ATM switch module to transfer signals therebetween, the fiber interface common card having, a plurality of selection gates, each being inputted a pair of outputs of the fiber interface cards and outputting one of the pair of outputs, and a control circuit for controlling each of the selection gates to select and output the one of the pair of outputs.

15. The asynchronous transfer mode switch according to claim 14, wherein the first transmission lines are subscriber lines.

16. The asynchronous transfer mode switch according to claim 15, wherein the second transmission lines are connected to toll switches.

* * * * *